United States Patent [19]

Anderhalden

[11] Patent Number: 4,993,897
[45] Date of Patent: Feb. 19, 1991

[54] ROUTER COMBINATION FOR INSTALLING WEATHER-STRIP SEALS

[76] Inventor: Arnold J. Anderhalden, 9012 Gullo Ave., Arleta, Calif. 91332

[21] Appl. No.: 438,191

[22] Filed: Nov. 20, 1989

[51] Int. Cl.$^5$ ............................................. B23C 1/20
[52] U.S. Cl. .............................. 409/180; 144/136 C; 409/181
[58] Field of Search .............. 409/175, 178, 181, 182, 409/180; 144/134 D, 136 C, 136 G, 1 F

[56] References Cited

U.S. PATENT DOCUMENTS

| | | | |
|---|---|---|---|
| 472,675 | 4/1892 | Linham | 144/241 |
| 1,409,258 | 3/1922 | Stenger | 144/219 |
| 2,630,152 | 3/1953 | Turnbull | 144/136 C |
| 2,637,225 | 5/1953 | Benbow | 408/99 |
| 2,702,569 | 2/1955 | Yelle | 144/136 C |
| 2,729,437 | 1/1956 | Brenner | 262/8 |
| 3,285,135 | 11/1966 | Shaw | 409/182 X |
| 3,893,372 | 7/1975 | Strakeljahn | 144/136 C X |
| 4,406,568 | 9/1983 | Rogers et al. | 409/182 |
| 4,608,291 | 8/1986 | Gove | 428/119 |

FOREIGN PATENT DOCUMENTS

| | | | |
|---|---|---|---|
| 2527996 | 1/1977 | Fed. Rep. of Germany | 409/178 |
| 1206024 | 1/1986 | U.S.S.R. | 409/175 |

*Primary Examiner*—William Briggs
*Attorney, Agent, or Firm*—William H. Maxwell

[57] ABSTRACT

A tool for the advancement of a router cutter along a door or window jamb, with its cutting axis at a compound angle, so as to eliptically undercut a channel complementary to a dart-shaped seal anchor having a rib projecting through a slot formed by a reduced stem of the cutter, the seal characterized by a depressible bulb shaped body lying contiguous to both the jamb and a slamming stop.

12 Claims, 2 Drawing Sheets

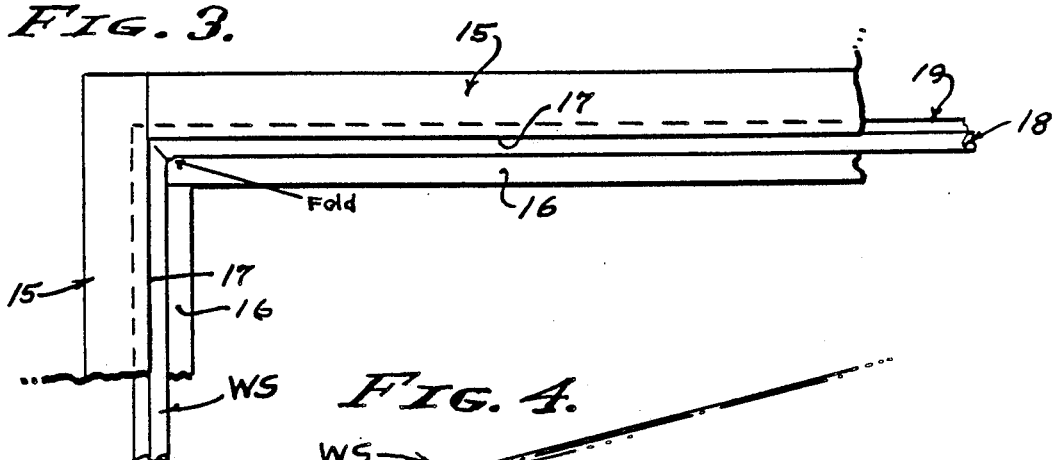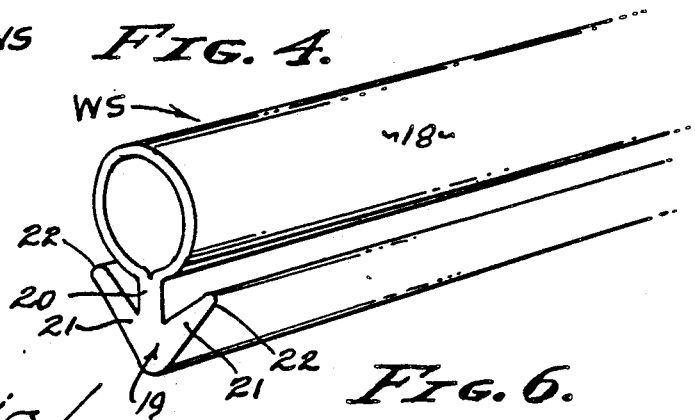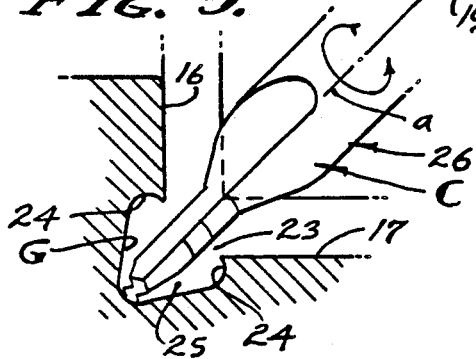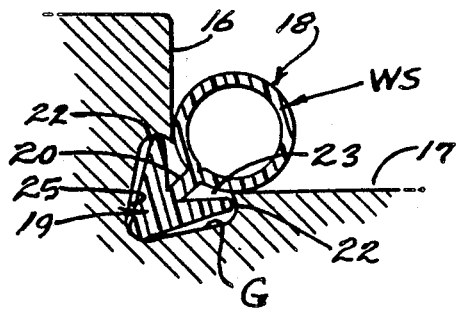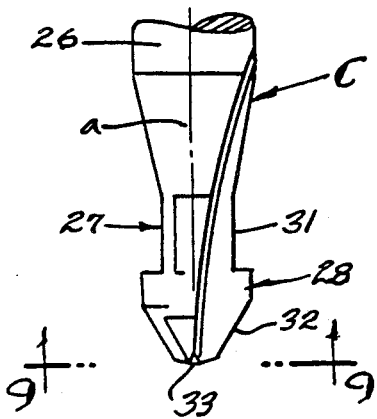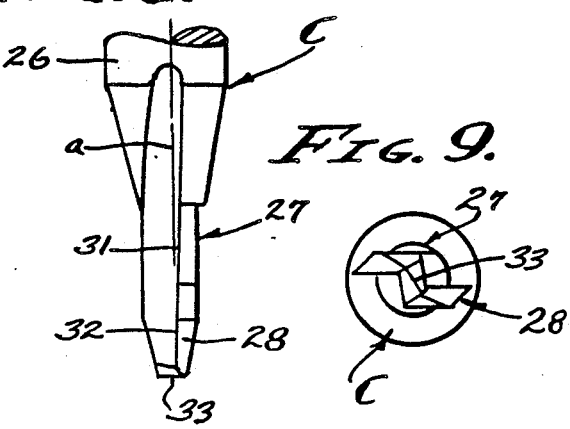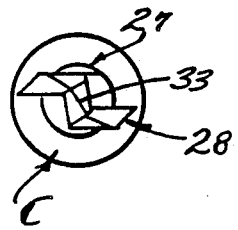

ROUTER COMBINATION FOR INSTALLING WEATHER-STRIP SEALS

BACKGROUND OF THE INVENTION

This invention relates to weather seals or stripping for door and window openings as they are constructed in buildings and the like. Conventional door and window jambs vary in type, there being casement doors and windows, double hung windows, and sliding doors and windows etc. . . It is wooden door and window jambs with which this invention is particularly concerned, those that can be routed for the reception of a continuous seal installed to be effective between the jamb and the moveable door or window, it being a general object of this invention to provide a method and tooling for the installation of weather strip seals in existing as well as new construction. This invention is characterized by a routing tool and cutter and by a seal configuration adapted to wooden jambs, headers or sills, whether new or old. However, it is an object of this invention to provide a seal equally useful for metal construction.

Door and window openings are constructed of a frame comprised of spaced jambs extending upward from a sill and joined at the top by a lintel or header. In casement doors and windows there is door stop or slamming stop, which is a strip or projecting surface against which the door or window closes. And, it is this stop with which this invention is particulary concerned, since the stops of the header and sill join at right angular corners with the stops on the jambs, and heretofore it has been difficult if not impossible to rout into such corners for the installation of a contiuous weather strip seal. The face of the stop is right angularly related to the face of the jamb, and it is an object of this invention to rout a seal groove disposed in a plane to bisect the right angularly related planes of said two faces. Accordingly, a routing tool is provided with a guide that simultaneously follows the faces of the stop and jamb or header, and also provided with means to advance and to retract a specially shaped cutter into and out of working position that routs an undercut groove at a compound angle into and bisecting the corner established by said two faces.

Heretofore, seal strips with dart-shaped anchors have been installed under the aforementioned stop and jamb condition, by routing dovetail grooves receiving a seal anchor of complementary shape; however, these seals are not entirely secure. When dart-shaped anchors are employed, a routing cutter of that configuration has been used at a right angle to the woodwork. However, a dart-shaped cutter has been considered inoperative for reaching at a compound angle into the corners of right angularly related jambs and headers and sills with said stops. An objection is that angular disposition of a cutter axis creates an oval undercut heretofore considered to be inferior and requiring an over-lengthy cutter barrel that would render the cutter to be overly fragile. However, with the present invention a descrete compound angle of the cutter is advantageously utilized and coordinated with the barrel length of the cutter to create an adequate shoulder at each side of the undercut groove of dart-shape configuration. The opposite anchor shoulders are a developement of the inclined cutter's flutes that converge to a point so as to cut a dart-shaped groove.

Heretofore, the operational proceedure of removing material with a router involves the adjustment of the cutter relative to a guide, following which the cutter is revolved at high speed and the entire tool lowered into the work until the cutter reaches full depth as controlled by the previously set guide. However, with the involvement of right angularly related jamb and stop faces, and the like, entry of the cutter into the work to a precise stopped position becomes difficult; when reaching into the corners presented by right angularly related jambs, headers and sills. Accordingly, it is an object of this invention to provide a precision stop for the entry of the cutter into these corners. A feature is the "pistol-grip" configuration of the cutter positioning means, by which the tool is comfortably manipulated with agility, whereby the front end of the guide advances the router cutter to a predetermined stopped position for termination of the cut made thereby.

It is an object of this invention to provide a routing tool, as hereinabove described, which is versatile and adapted to different door and window situations. That is, the moveable doors and windows may or may not be installed or removed, some are of the casement type while others are of the sliding type, and the construction to be improved with seals might be old or new. Accordingly, guide shoes are provided and which are formed to be complementary to the jamb and step configuration to be routed, an example of which is shown and described.

It is also an object of this invention to provide for angular advancement of the cutter and of the router axis, at a descrete compound angle selected for entry of the cutter into the corner established by the right angularly related jambs, headers and sills. The coumpound axis angle selected is substantially 60°, and is prefereably a 60° angle which is complementary to the cutter configuration shown and herein described.

SUMMARY OF THE INVENTION

This invention makes possible the continuity of weather strip seals securely installed in door and window frames, for engagement with moveable doors and windows. The superior anchoring capability of a dart-shaped undercut is routed into new or existing buidling structure, by the tool provided herein in conjunction with a complementary cutter. The tool features an angular disposition of the router axis, and the cutter is advanced into the work through hand-grip force and the cutter position is controlled by an associated guide engageable with and to follow the jamb face and its slamming stop. Compound angularity of the router axis with respect to the planar surface or surfaces to be routed is descretely selected as 60° through and/or from the vertex formed by said two surfaces, an approximate angle at which the oval cut by the major diamater of the cutter forms a shoulder disposed at a right angle to the apex of the dart-shaped groove routed thereby. The seal is an extrusion of silicon plastic material, or the like, that is supple and depressible, and with memory to return to its original deformable tube shape. This deformable tube is held in position tangent to the planes of the jambs or header or sill, and tangent to the planes of the slamming stop, where it is depressed by the closing of the door or window, as the case may be. The dart-shaped anchor is integral with the deformable tube and projects therefrom in a plane radial to the axis of the tube, to enter and occupy the routed groove. Accordingly, the seal extends into and turns through each corner without being severed. However, seal sections may join at the corners into which they extend.

The foregoing and various other objects and features of this invention will be apparent and fully understood from the following detailed description of the typical preferred forms and applications thereof, throughout which description reference is made to the accompanying drawings.

THE DRAWINGS

FIG. 3 is a view of a door or window jamb, showing the weather strip installed through a corner formed by two jambs.

FIG. 4 is an enlarged perspective view of the flexible and depressible weather strip seal.

FIG. 5 is an enlarged fragmentary sectional view, showing the cutter in the process of cutting the groove or rabbet.

Figure 1:
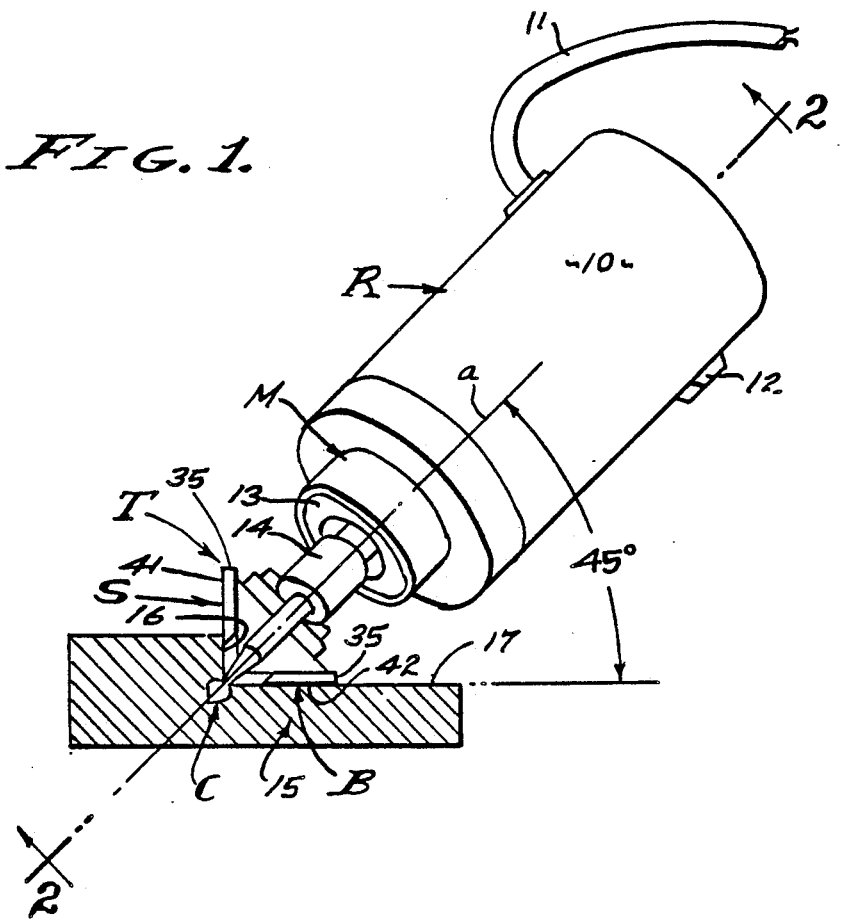
FIG. 1 is a front view of the hand tool and router combination, showing the 45° bisection of the cutter axis with respect to the jamb face and slamming stop.

FIG. 6. is a view similar to FIG. 5, showing the weather strip seal installed in the groove or rabbet.

FIG. 7 is a side view of a cutter having the feature of the present invention.

FIG. 8 is a side view of the cutter shown in FIG. 7.

And, FIG. 9 is an end view taken as indicated by line 9—9 on FIG. 7.

PREFERRED EMBODIMENT

Referring now to the drawings, the tool T is a handgrip device that shiftably carries a router machine R for advancing a cutter C into the jamb faces of windows and doors, and the like. It is the angular faces of jambs which are of concern, namely the right angular jamb and slamming or sliding stop faces, and also the right angular jambs and sill and headers. This invention is concerned primarily with wood working machines known generally as routers, the router R is shown herein as comprised of a motor and body 10 with a power cord 11 and switch control 12, and a mounting barrel 13 of cylinder form coaxial with a drive shaft that carries a chuck or collet 14. The cutter C of this invention is secured in the collet 14 to project along the turning axis a of the router R in order to enter a work piece, in this instance to enter the jamb and/or to penetrate into the aforementioned corners. It is to be understood that this tool T, router R and cutter C combination is applicable to various jambs or like situations, a feature being the guide shoe S that controls the compound 45°-60° angular disposition of the cutter C that is advanced by means of hand grip manipulation of the tool, both to penetrate the cutter C into the work and to advance the cutter linearly of the work, limited intravel by a stop that precludes overtravel at a corner terminus.

Figure 2:
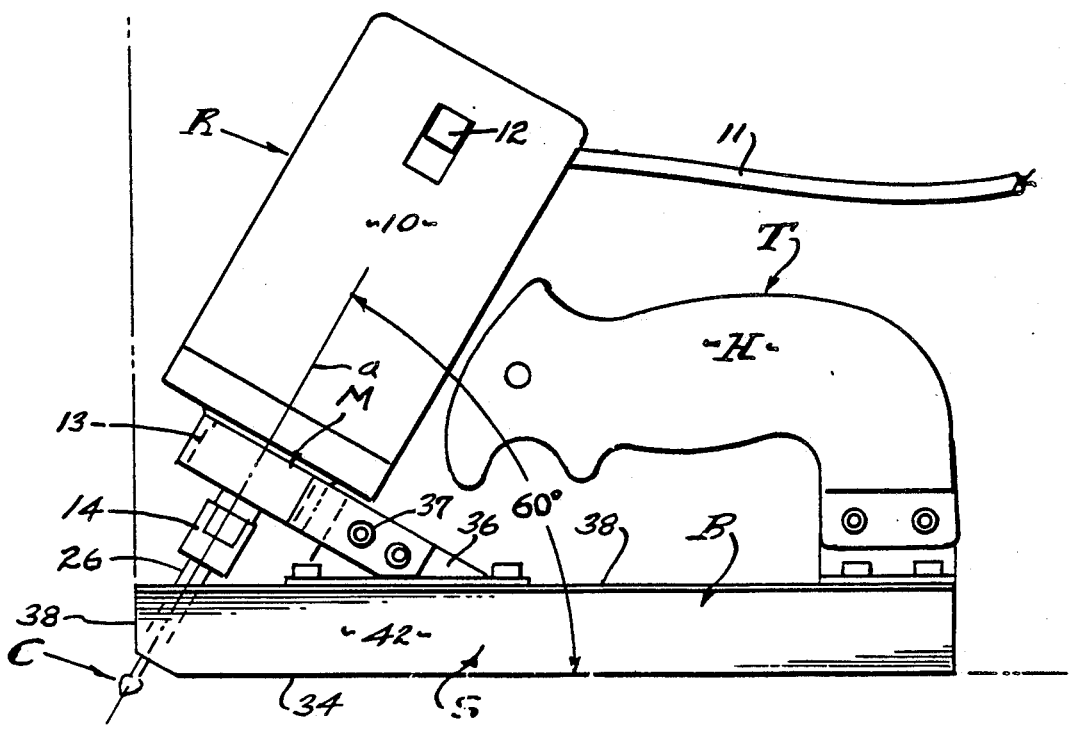
FIG. 2 is a side view taken as indicated by line 2—2 on FIG. 1, showing the 60° compound angle of the cutter axis for its entry into the woodwork ahead of the tool guide.

Typical jamb members 15 are shown in FIGS. 1 and 3 of the drawings, and the step or slamming stop 16 is typically at a right angle to the face 17 thereof. FIGS. 1, 2 and 5 illustrate the manner in which the cutter C is worked in relation to the stop 16 and face 17, FIG. 6 showing the way the seal groove G receives the weather strip WS. The weather strip WS is shown in its elongated form in FIG. 4, being an elongated body extruded of silicon plastic or the like that is soft and pliable, and depressible for seal engagement with a door or window that is closed thereagainst. The weather strip WS is comprised of a depressible body 18 and a dart-shaped anchor 19, integrally formed as by a tubular extrusion or the like and joined by a rib 20. In practice, the body 18 is tubular with a thin and flexible cylindrical wall, the rib 20 projects radially from the body wall and carries a pair of rearwardly divergent flanges 21, diverging at approximately 60°, and terminating in continuous parallel edges 22 spaced equally from opposite sides of the rib 20 in a plane at or slightly below the body 18. There are variations of this weather seal WS configuration, as circumstances require. The anchor flanges 21 are depressible so as to be readily forced into working position within the confines of the seal grooves G next described.

The seal groove G is the configuration that is cut into the work piece or jamb member 15, and it is of a form complementary to that of the dart-shaped anchor 19. A feature of this groove and seal arrangement is that the depressible body 18 of the weather strip WS lies contiguous to both the face or faces of the jamb member and of the slamming stop (see FIG. 6). Also, the rib 20 of the weather strip WS enters through a continuous slot 23 of the groove G while the anchor flanges 21 are captured within the undercut rails 24 of the groove G (see FIG. 5). Accordingly, the groove G is characterized by spaced parallel rails 24 that form the slot 23, and by an underlying channel 25 of dart-shaped configuration that permits spreading of the weather strip flanges 21 into engagement beneath the rails 24, thereby capturing the weather strip WS in working position with the body 18 thereof exposed for compression by the closing of a window or door.

The cutter C is provided to form the above described seal groove G, and it is rotated at high speed by the router R on an axis a coincidental with a bilateral 45° plane of symetry of said groove G, as it bisects the jamb face 17 and slamming stop 16. The router R and driven cutter C are guided by the shoe S of the tool T so as to move forwardly and rearwardly with the axis a held in said 45° plane of symetry, as later described. A feature of this tool T is the compound angular disposition of the cutter axis a to the bisecting angle, or 45° between the jamb face and slamming stop (see FIG. 1). In practice, the compound angular disposition is 60° as shown, whereby the cutter C can be advanced by the tool T to enter the corners which are otherwise inaccessible to the cutter. An angle of 60° more or less, is most practical.

The cutter C is comprised of a shank 26 that is chucked in the router R, a stem 27 that cuts the slot 23, and a head 28 that cuts the channel 25. The shank 26 is an elongated cylindrical solid that carries the stem and head, the latter being of high speed material such as carbide. The shank is of a diameter of for example 0.250 inch, substantially the same as the major diameter of the head 28, and it tapers the stem for chip clearance. The cutter is of "spade" form as shown, the stem 27 and head 28 extending integrally as a flattened member having diametrically opposite cutting edges. The stem 27 and head 28 are flattened so as to have cutting faces establishing diametrically opposite cutting edges at the periphery of the cutter. Referring to FIG. 9 of the drawings, the stem 27 has a reduced cutting diameter of for example 0.150 inch, for a substantial axial length of for example 0.120 inch, the periphery at each cutting edge 31 being relieved for clearance when cutting the slot 23. The head 28 is full diameter of for example 0.225 inch, for a limited axial length of for example 0.050 inch. this being for durability in undercutting the rails 24 (see FIG. 5). The head 28 is convergent so as to cut a dart-shaped channel 25, and to this end its diametrically opposite cutting edges 32 are symetrically convergent from the aforementioned full diameter, and to a point 33 and preferably a blunted point for cutting a rounded bottom of the channel 25, as a result of the compound inclined axis of the cutter. Accordingly, the straight parallel cutting edges of the stem 27 cut straight parallel slot edges, while the full diameter and reduced point diameters of the head 28 cut eliptical cross sections, as shown. Note however, that the eliptical undercut of the rails 24 form shoulders disposed substantially normal (90°) to the bottom center of the channel 25, thereby ensuring reliable anchored engagement with the edges 22 of the weather strip flanges 21.

In accordance with this invention, and in view of the foregoing described work processes of the cutter C, forming the undercut channel 25 in the face 17 of the jamb member, and preferably on the bisecting plane of joinder between the face 17 and the face 16 of the slamming stop, the tool T is provided to fixably carry the router R for advancement of the cutter C into and for manipulation along the jamb and/or stop to be sealed against a closed window or door. As shown, the tool T includes a runner-like base B, a router mounting means M projecting upward from the front portion of the base, the slide shoe S coextensively secured to the bottom of the base, and a handgrip H at the rear portion of the base for manipulation of the tool. In its preferred form, the motor mounting means M positions and secures the router R on the angular axis a, and is shown as a clamp means secured to the front of the base B by screws (see FIGS. 1 and 2). In its preferred from, the mounting means M is comprised of a clamp ring secured by a bracket 36 to the front of the base so as to project the router axis a therefrom at a 30° upwardly inclined angle, or angularly downwardly and forwardly at 60°. The mounting barrel 13 of the router is also positioned thereon along its axis a, so as to be set by the clamp screws 37 secured as shown.

Referring now to the base B of runner-like form, it is the work engageable member that follows the surface or surfaces to be routed. The base B is an elongated member that is substantially narrow so that the router and cutter axis a can be closely spaced from the stop 16, or so that the axis a can intersect the joinder of face 17 and stop 16 with the vertex 34 thereof closely related to said joinder or corner to be routed. In practice, the base B is a relatively slender elongated member with parallel sides 35, and a flat top 38 parallel with the flat vertex 34. The straight vertex 34 can slide directly upon the work surface, although replaceable shoes may be used. That is, the base B is adapted to a variety of jamb configurations and the like. A typical jamb is shown wherein the shoe S is provided for adapting the tool T to rout the channel 25 for installing of the weather strip WS as shown in FIG. 6. Shoe S is characteristically "V" shaped with right angularly related sides 41 and 42 joined at a vertex 34 coincidental with the axis a and coincidental with the the bisection thereof. The sides 41 and 42 have flat sliding engagement with the face 17 and side face of the slamming stop 16.

Referring now to the handgrip H, a primary purpose of tool T is to facilitate its manipulation by the operator. Accordingly, the handgrip H is fixedly integral with the base B and extends upwardly and forwardly from the rear portion of the base, remote from the mounting means M and router R at the front of the base. The handgrip H is essentially a "pistol" type grip which can be conveniently grasped to position the tool T with respect to and to slide it upon the work surface to be routed.

Referring now to the guide shoe S, a feature of this invention is the ability to position the tool T with respect to the work as governed by the shoe S, or by any other such adapter as circumstances may require, and during which or after which manipulation the router R is operated to turn the cutter C at high speed, and whereupon the rotating cutter can be advanced to its working depth before forward or rearward movement to cut the seal groove G. In accordance with this invention, forward movement of the guide shoe S is restricted by the front terminal end 38 thereof, which end forms a stop that limits forward penetration of the cutter C into the work, while the sides 41 and 42 of the shoe are slideably engaged with the jamb face 17 and slamming stop 16.

From the foregoing it will be understood how the hand tool of the present invention is combined with the router and the special cutter to form continuous seal grooves for anchored reception of a weather-strip seal. A feature is the compound angle of the cutter axis forming the groove and bisecting the angle of a jamb face and its slamming stop. In practice, the tool base is placed into work contact for positioning the cutter, whereupon the guide is manipulated to advance the cutter into the work to be grooved by forward or rearward movement of the router and cutter and tool combination. The compound angularity of the cutter axis, as specified, has two principal purposes, firstly to eliptically form the top and bottom of the groove channel, and secondly to project the channel of the groove ahead of the tool and also beyond the face of a right angularly related jamming stop, usually a like jamb and stop disposed at 90° to that which is being grooved.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A hand tool for advancement of a router and cutter disposed on an angle bisecting a corner of a jamb face and an angularly related slamming stop to cut a continuous groove for the anchored securement of a weather-strip seal therein, and including;
   an elongated V-shaped base having angularly related sides forming a vertex guidedly engageable into the corner of the jamb and angularly related slamming stop,
   router means on the base and carrying the cutter on an axis disposed on said angle bisecting the angularly related sides of the V-shaped base and in alignment with said vertex and disposed on said angle bisecting the corner of the jamb and angularly related slamming stop and projecting forwardly and beyond the front end of the base at an acute angle with respect to the longitudinal disposition of said vertex,
   the router cutter having a cutting stem of reduced diameter projecting from the vertex of the V-shaped base, and having a cutting head of larger diameter carried by the stem and spaced from said vertex to undercut the continuous groove, and handgrip means on the base to manipulate the hand tool for advancement of the router and cutter along said bisecting angle.

2. The hand tool for advancement of a router and cutter as set forth in claim 1, wherein the router cutter has a symetrically pointed spade-shaped cutting head of larger diameter carried by the stem and spaced from said vertex to undercut the continuous groove.

3. The hand tool for advancement of a router and cutter as set forth in claim 1, wherein the router cutter has a spade-shaped cutting head of larger diameter carried by the stem and spaced from said vertex to undercut the continuous groove.

4. A hand tool for advancement of a router and cutter disposed on an angle bisecting a corner of a jamb face and an angularly related slamming stop to cut a continuous groove for the anchored securement of a weatherstrip seal therein, and including;

an elongated V-shaped base having angularly related sides extending rearwardly from a front end and forming a vertex guidedly engageable into the corner of the jamb and angularly related slamming stop, router means on the base and carrying the cutter on an axis disposed on said angle bisecting the angularly related sides of the V-shaped base and in alignment with said vertex and disposed on said angle bisecting the corner of the jamb and angularly related slamming stop, the cutter axis being inclined downwardly and forwardly through the vertex of the V-shaped base and projecting forwardly and beyond the front end of the base at an acute angle of substantially 60° with respect to the longitudinal disposition of said vertex, and handgrip means on the base to manipulate the hand tool for advancement of the router and cutter along said bisecting angle.

5. The hand tool ofor advancement of a router and cutter as set forth in claim 4, wherein the front end of the V-shaped base is a stop engageable with angularly related jambs and slamming stops to limit forward movement of the router cutter ahead of the V-shaped base, and wherein the router cutter has a cutting stem of reduced diameter projecting from the vertex of the V-shaped base, and has a spade-shaped cutting head of larger diameter carred by the stem and spaced from the vertex to undercut the continuous groove.

6. The hand tool for advancement of a router and cutter as set forth in claim 4, wherein the router and cutter axis projects from the V-shaped base in alignment with said vertex at the front end of the V-shaped base, and wherein the router cutter has a cutting stem of reduced diameter projecting from the vertex of the V-shaped base, and has a spade-shaped cutting head of larger diameter carried by the stem and spaced from said vertex to undercut the continuous groove.

7. The hand tool for advancement of a router and cutter as set forth in claim 4, wherein the front end of the V-shaped base is a stop engageable with angularly related jambs and slamming stops to limit forward penetration of the router cutter ahead of the V-shaped base.

8. The hand tool for advancement of a router and cutter as set forth in claim 4, wherein the router and cutter axis projects from the V-shaped base in alignment with said vertex at the front end of the V-shaped base.

9. The hand tool for advancement of a router and cutter as set forth in claim 4, wherein the router cutter has a cutting stem of reduced diameter projecting from the vertex of the V-shaped base, and has a cutting head of larger diameter carried by the stem and spaced from said vertex to undercut the continuous groove.

10. The hand tool for advancement of a router and cutter as set forth in claim 4, wherein the router cutter has a cutting stem of reduced diameter projecting from the vertex of the V-shaped base, and has a cutting head of larger diameter carried by the stem and spaced from said vertex to undercut the continuous groove, and wherein said cutter head is spade-shaped.

11. The hand tool for advancement of a router and cutter as set forth in claim 4, wherein the front end of the V-shaped base is a stop engageable with angularly related jambs and slamming stops to limit forward movement of the router cutter ahead of the V-shaped base, and wherein the router cutter has a cutting stem of reduced diameter projecting from the vertex of the V-shaped base, and has a cutting head of larger diameter carried by the stem and spaced from said vertex to undercut the continuous groove.

12. The hand tool for advancement of a router and cutter as set forth in claim 4, wherein the router and cutter axis projects from the V-shaped base in alignment with said vertex at the front end of the V-shaped base, and wherein the router cutter has a cutting stem of reduced diameter projecting from the vertex of the V-shaped base, and has a cutting head of larger diameter carried by the stem and spaced from said vertex to undercut the continuous groove.

* * * * *